United States Patent [19]

Kondo

[11] Patent Number: 5,060,766
[45] Date of Patent: Oct. 29, 1991

[54] DISC BRAKE ASSEMBLY
[75] Inventor: Toshio Kondo, Okazaki, Japan
[73] Assignee: Aisin Seiki Kabushiki Kaisha, Kariya, Japan
[21] Appl. No.: 559,374
[22] Filed: Jul. 26, 1990

Related U.S. Application Data

[63] Continuation of Ser. No. 314,113, Feb. 23, 1989, abandoned.

[30] Foreign Application Priority Data

Feb. 23, 1988 [JP] Japan .................... 63-040144

[51] Int. Cl.⁵ ............... F16D 55/227; F16D 65/02
[52] U.S. Cl. ...................... 188/73.39; 188/73.1; 188/73.38; 188/250 B; 188/7
[58] Field of Search .............. 188/73.39, 73.38, 73.44, 188/73.45, 71.1, 73.1, 73.39, 250 B

[56] References Cited

U.S. PATENT DOCUMENTS

| Re. 32,470 | 8/1987 | Wright | 188/73.39 X |
|---|---|---|---|
| 3,972,393 | 8/1976 | Courbet et al. | 189/73.31 |
| 4,119,180 | 10/1978 | Horie | 188/73.39 X |
| 4,162,721 | 7/1979 | Moriya | 188/73.38 |
| 4,296,841 | 10/1989 | Fujimori et al. | 188/73.1 X |
| 4,313,527 | 2/1982 | Pickel | 188/73.1 X |
| 4,609,077 | 9/1986 | Nakatsuhara | 188/73.39 X |
| 4,865,163 | 9/1989 | Kondo | 188/73.38 |
| 4,940,119 | 7/1990 | Kondo et al. | 188/73.39 X |

FOREIGN PATENT DOCUMENTS

| 2211013 | 9/1973 | Fed. Rep. of Germany | 188/73.38 |
|---|---|---|---|
| 2640824 | 3/1977 | Fed. Rep. of Germany | 188/73.1 |
| 24964 | 3/1978 | Japan | 188/73.39 |
| 62-96134 | 6/1987 | Japan | |
| 172027 | 7/1988 | Japan | 188/73.39 |
| 2057074 | 3/1981 | United Kingdom | 188/73.38 |
| 2163500 | 2/1986 | United Kingdom | 188/73.31 |
| 2199909 | 7/1988 | United Kingdom | 188/73.38 |

Primary Examiner—George E. A. Halvosa
Attorney, Agent, or Firm—Burns, Doane, Swecker & Mathis

[57] ABSTRACT

A disc brake assembly includes a disc rotor rotated with a wheel in a body, a mounting member fixed to a stational member of vehicles and having an arm portion in which a pair of grooves extending toward to the axial direction of the disc rotor are provided therein. A brake pad disposed to at least one side of the disc rotor and having a pair of ear portions which are outwardly projected at the center portion or the outer side of both ends in the rotational direction of the disc rotor of its backing plate, respectively and which are fitted into a pair of groove portion formed in the arm portion of the mounting member and slidably supported on the arm portion of the mounting member toward to the axial direction of the disc rotor. The brake pad has a backing plate in which end surfaces in the rotational direction of the disc rotor of the rotational center side of the disc rotor from the each ear portion are formed in wedge-shape in the diameter direction of the disc rotor and the mounting member has torque resisting surfaces opposed to the rotational center side of the disc rotor from each ear portion of the end surfaces of the backing plate in the rotational direction of the disc rotor at its arm portion and formed in V-shape in corresponding to the backing plate. Since the brake pad is held under a stable condition in the diameter direction and the rotational direction of the disc rotor and is prevented from movement, it is able to fundamentally prevent generation of the uncomfortable squeak noise of the disc brake assembly caused by movement of the brake pad.

10 Claims, 4 Drawing Sheets

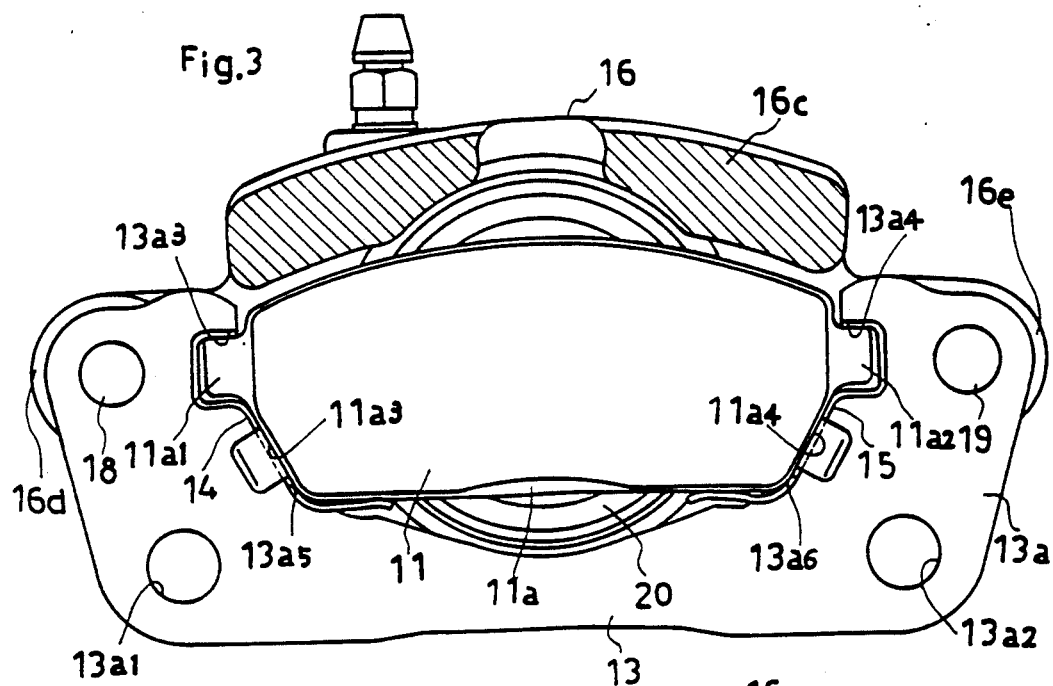
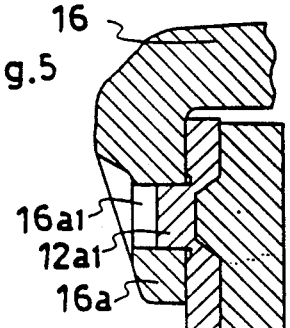
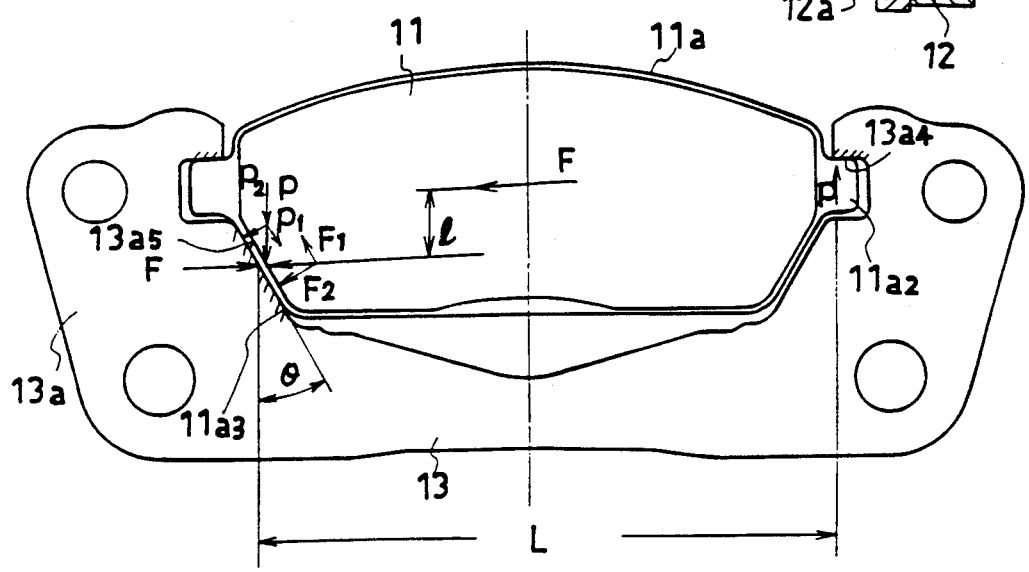

DISC BRAKE ASSEMBLY

This application is a continuation of application Ser. No. 314,113, filed Feb. 23, 1989, now abandoned.

BACKGROUND OF THE INVENTION

1. Field of the Invention

The present invention relates to a disc brake assembly for wheeled vehicles, and more particularly to the disc brake assembly which includes a brake pad having a pair of ear portions which are projected outwardly at a center portion or an outer side from the center portion of both ends in the rotational direction of the disc rotor and its backing plate, respectively, and which are fitted into a pair of groove portions formed in an arm portion of a mounting member which is fixed to a part of a vehicle body, and slidably supported on each arm portion toward to the axial direction of the disc rotor. Further, the present invention relates to a disc brake assembly which receives a friction force due to operation of the brake pad by the disc rotor under the disc brake assembly operating condition with a torque resisting surface of the arm portions of the mounting member contacting with the end surface of the backing plate in the rotational direction of the disc motor.

2. Description of the Related Art

A conventional disc brake assembly of this kind is disclosed, for example, in Japanese Utility Model application laid-open publication No. 62-96134 published on June 19, 1987. This conventional disc brake assembly includes a pair of brake pads having backing plates whose both end surfaces in the rotational direction of the disc rotor at a substantially center portion (press center) of each brake pad and the mounting member having torque resisting surfaces which are opposite to the both end surfaces of the backing plate in the rotational direction of the disc rotor in parallel. In this conventional disc brake assembly, the friction force transmitted to the brake pad toward the tangent direction is vertically transmitted to the torque resisting surface when the disc brake assembly is operated and the brake pad does not receive a force in the diameter direction of the disc rotor, therefore each brake pad is in an unstable condition when the disc brake assembly is operated.

An analysis of the relationship between movement of each brake pad and the generation of an acceptable squeak noise of the disc brake by various experiments. As a result, it was confirmed that since each brake pad is unstable in the diameter direction of the disc rotor, as shown by FIG. 9, if a friction force F transmitted to each brake pad (the position of the press center) changes in the diameter direction of the disc rotor due to a concavity or convexity of the frictional surface of the each brake pad, a swing of the disc rotor, a bend of the caliper member (the bridge portion of the caliper member bends so as to separate the reaction portion from the cylinder portion) and so on, each brake pad 2 is moved with respect to the torque receiving surface 1a of the mounting member 1 as shown by an imaginary line in FIG. 9. Further, if an uncomfortable squeak noise of the disc brake assembly is generated when the disc brake assembly is operated, each brake pad is subjected to movements as mentioned above, and in case of the generation of an acceptable squeak noise of the disc brake assembly the brake pads have very little movement.

For preventing the uncomfortable squeak noise of the disc brake assembly, as discussed above, the various noise preventing means, for example a means for equalizing a distribution of the dynamic pressure of each brake pad (a means for regulating the press center of each brake pad, for example, positioning a shim plate between the backing plate of each brake pad or offsetting the press center of each brake pad) and so on have been proposed. However, since these measures for preventing noise relate to the shape of the backing plate of each brake pad and each arm portion of the mounting member supporting each brake pad, it is impossible to perfectly prevent all of the movement of each brake pad as shown by FIG. 9 and it has been unable to prevent the squeak noise of the disc brake assembly.

SUMMARY OF THE INVENTION

It is, therefore, an object of the present invention to prevent the generation the uncomfortable squeak noise of the disc brake assembly during operational conditions of the disc brake assembly.

It is another object of the present invention to prevent movement of the brake pad when the disc brake assembly is operated.

It is further object of the present invention to decrease the weight of the disc brake assembly.

It is further object of the present invention to reduce the manufacturing cost of the disc brake assembly.

It is further object of the present invention to provide an improved disc brake assembly which includes a disc rotor rotated with a wheel in a body, a mounting member fixed to a stationary member of a vehicle and having an arm portion in which a pair of grooves extend toward the axial direction of the disc rotor, a brake pad positioned to at least one side of the disc rotor and having a pair of ear portions which are outwardly projected at a center portion or at the outer side of both ends in the rotational direction of the disc rotor or its backing plate, respectively, and which are fitted into a pair of grooved portions which are formed in the arm portion of the mounting member and slidably supported on the arm portion of the mounting member toward to the axial direction of the disc rotor. The brake pad has a backing plate in which end surfaces in the rotational direction of the disc rotor of the rotational center side of the disc rotor from each ear portion are formed in wedge-shape in the diameter direction of the disc rotor. The mounting member has torque resisting surfaces opposed to the rotational center side of the disc rotor from each ear portion of the end surfaces of the backing plate in the rotational direction of the disc rotor at its arm portion and formed in V-shape in corresponding to the backing plate.

BRIEF DESCRIPTION OF THE DRAWINGS

Additional objects and advantages of the present invention will become more apparent from the following detailed description of preferred embodiments thereof when considered with reference to the attached drawings, in which:

FIG. 3 is a sectional view taken substantially along the line III—III of FIG. 2;

FIG. 5 is a sectional view showing the relationship between the outer brake pad and the reaction portion of a disc brake assembly shown in FIG. 1;

FIG. 6 is a diagram of the operation of the disc brake assembly in accordance with the present invention;

DESCRIPTION OF PREFERRED EMBODIMENTS

Figure 1:
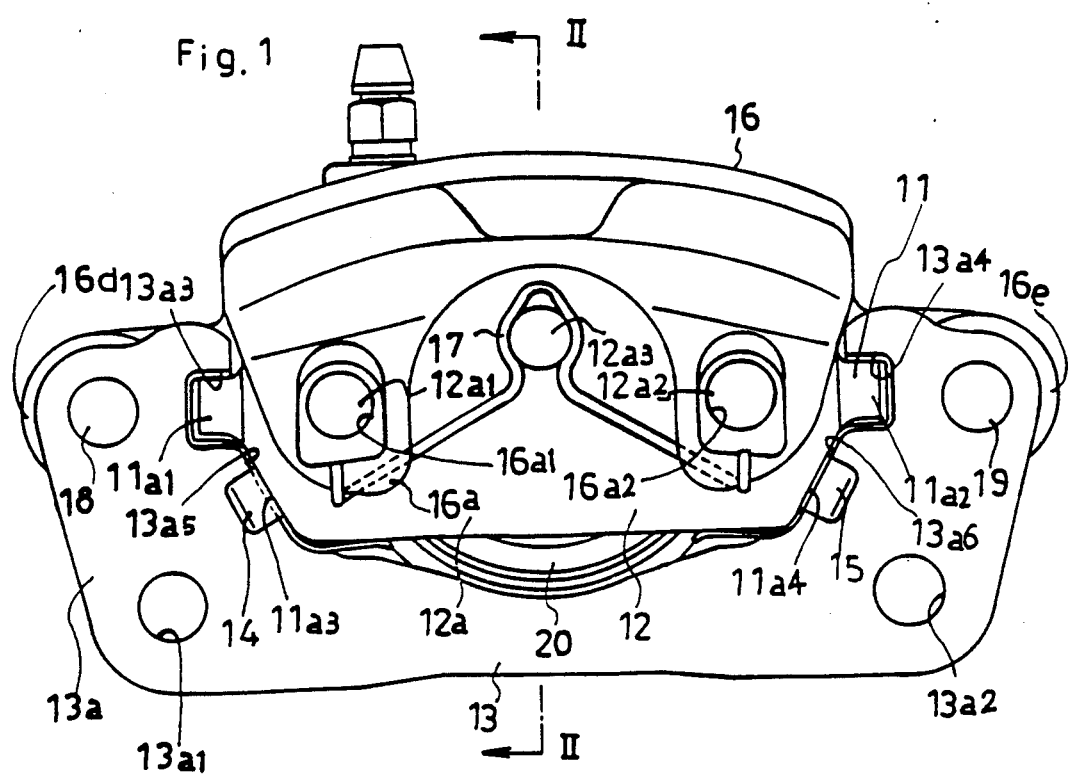
FIG. 1 is an elevational view of a disc brake assembly in accordance with the present invention.
Figure 2:
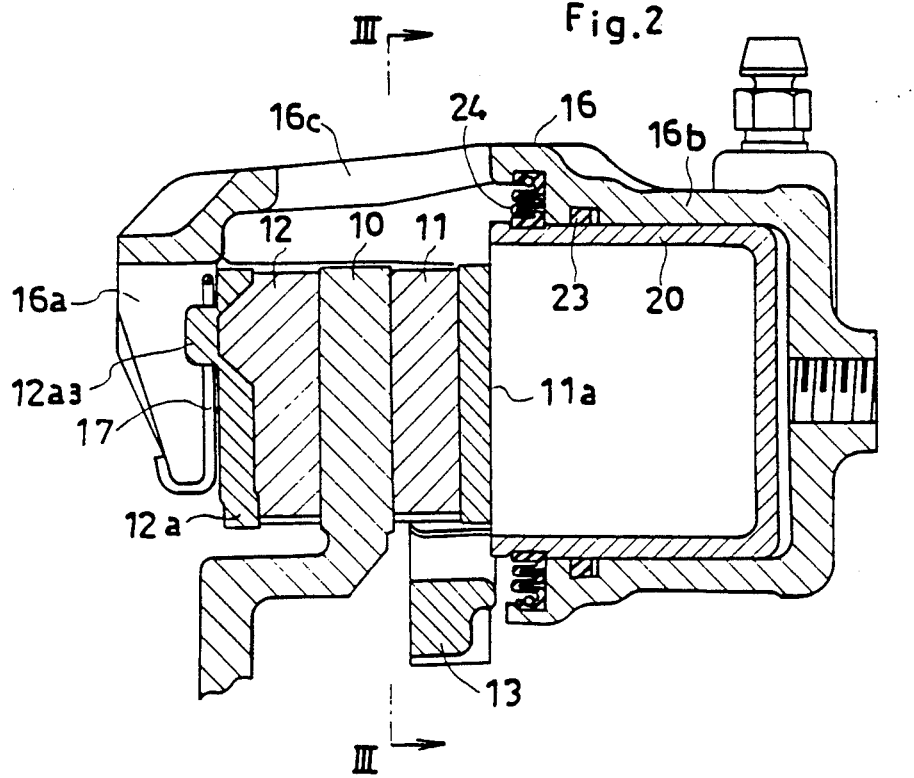
FIG. 2 is a sectional view taken substantially along the line II—II of FIG. 1.
Figure 4:
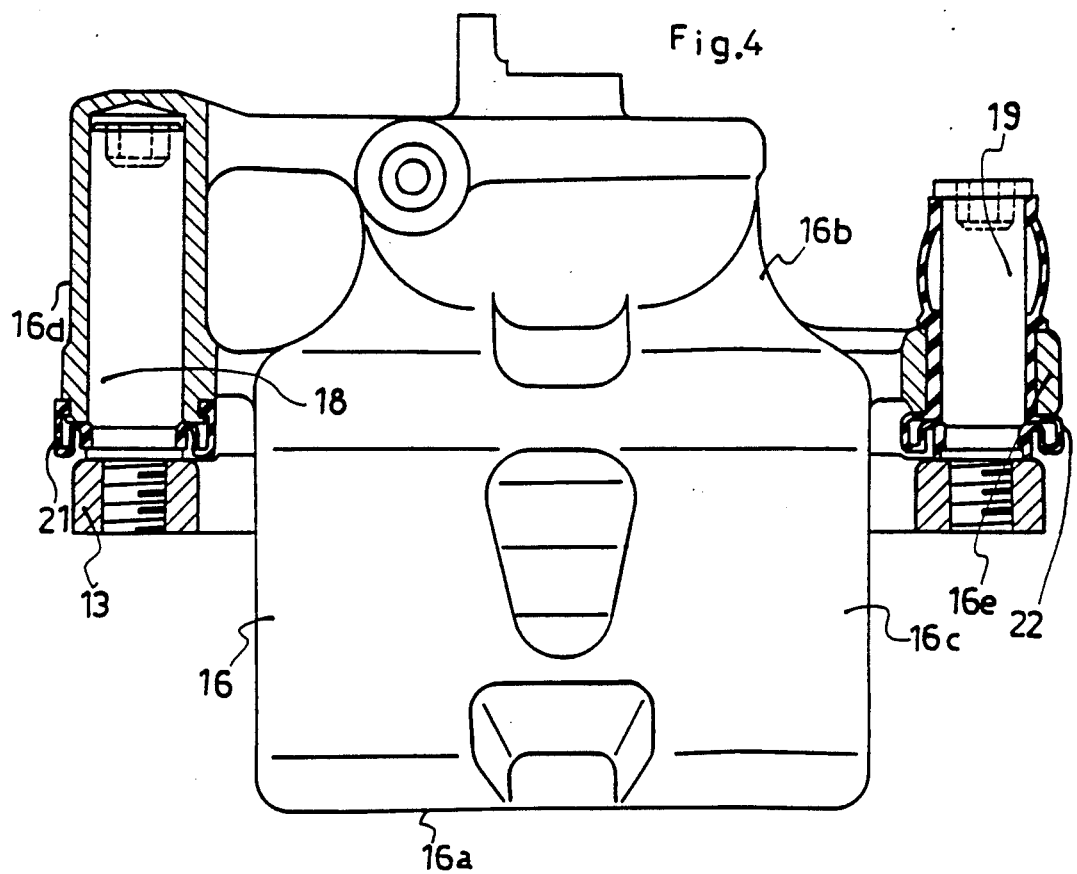
FIG. 4 is a partly sectional plan view of a disc brake assembly shown in FIG. 1.

A disc brake assembly constituted in accordance with preferred embodiments of the present invention will be described with reference of the drawings.

Referring to FIG. 1–FIG. 5, there is schematically illustrated a disc brake assembly which includes a disc rotor 10, a pair of brake pads (an inner brake pads 11, an outer brake pads 12), a mounting member 13 and a caliper member 16. The inner brake pad 11 and the outer brake pad 12 are positioned on either side of the disc rotor 10 which is rotated with a wheel of a vehicle.

The inner brake pad 11 is provided with a pair of ear portions $11a1$, $11a2$ which project outwardly from substantially center portions of both ends of the brake pad in the rotational direction of the disc rotor 10 of its backing plate $11a$, respectively. The respective ear portion $11a1$, $11a2$ are fitted into a pair of groove portions $13a3$, $13a4$ which are formed in an arm portion $13a$ of the mounting member 13 (the mounting member 13 is fixed to a part of the vehicle body at inner circumference portion, namely installing holes $13a1$, $13a2$) through springs 14,15, respectively, whereby the inner brake pad 11 is slidably supported on the arm portion $13a$ of the mounting member 13 in the axial direction of the disc rotor 10. The inner brake pad 11 is formed into a wedge-shape toward the rotational center of the disc rotor 10 in the diameter direction of the disc rotor 10 at both end surfaces $11a3$, $11a4$ of the backing plate $11a$ in the rotational direction of the disc rotor 10 of the rotational center side of the disc rotor 10 from each ear portion $11a1$, $11a2$.

The mounting member 13 is provided with a pair of torque resisting surfaces $13a5$, $13a6$ opposed to the end surfaces $11a3$, $11a4$ of the backing plate $11a$ in the rotational direction of the disc rotor 10 at the arm portion $13a$ and formed into a V-shape corresponding to the backing plate $11a$. Springs 14, 15 are provided to protect the sliding surface of the inner brake pad 11 and prevent play of the inner brake pad 11. The inner brake pad 11 is urged toward the upper direction in FIG. 1 and FIG. 3 by the springs 14, 15 and each ear portion $11a1$, $11a2$ is contacted with each upper wall surface of each groove portion $13a3$, $13a4$. The springs 14, 15 have an engaging portion which is elastically engaged with the surface of the backing plate $11a$ of the rotational center of the disc rotor 10.

On the other side of the rotor, the outer brake pad 12 is provided with a pair of engaging projections $12a1$, $12a2$ and a supporting projection $12a3$ at the backing surface of the backing plate $12a$. The engaging projections $12a1$, $12a2$ are received in respective holes or openings $16a1$, $16a2$ which are formed in a reaction portion $16a$ of a caliper member 16, and a spring 17 is positioned between the supporting projection $12a3$ and the reaction portion $16a$. The outer brake pad 12 is integrally installed on the reaction portion $16a$. The spring 17 is a torsion spring which is engaged with tip portions of the reaction portion $16a$ at both of its end portions and clamps around the supporting projection $12a3$ at a center bending portion of the spring, whereby the spring 17 urges the outer brake pad 12 in a lower direction (toward to the rotational center of the disc rotor 10) and in the direction in which the backing surface of the backing plate $12a$ is contacted with the reaction portion $16a$. Accordingly, relative movement between the outer brake pad 12 and the reaction portion $16a$ is prevented. The center bending portion of the spring 17 has a diameter which is smaller than the diameter of the supporting portion $12a3$ when the spring 17 is not installed and the spring 17 strongly clamps the supporting projection $12a3$ by the engagement of both end portions of the spring with the tip portions of the reaction portion $16a$.

The caliper member 16 straddles a portion of the disc rotor 10 and is provided with the reaction portion $16a$ which presses the outer brake pad 12 toward to an outer side surface of the disc rotor 10. A cylinder portion $16b$ receives a piston 20 which will press the inner brake pad 11 toward to an inner side surface of the disc rotor 10 and a bridge portion $16c$ connects the reaction portion $16a$ and the cylinder portion $16b$. The caliper member 16 is provided with a pair of arm portions $16d$, $16e$ and is slidably supported on a pair of pins 18, 19 which are fixed to the mounting member 13 in an axial direction on the arm portions $16d$, $16e$. The sliding portions between each arm portion $16d$, $16e$ and each pin 18, 19 is sealed in a liquid tight manner and is protected from muddy water and so on by a pin boot 21, 22, respectively, and the sliding portion between a cylinder hole or opening of the cylinder portion $16b$ and the piston 20 is sealed in a liquid tight manner by a seal ring 23 and is protected from muddy water and so on by a boot 24.

According to this embodiment when hydraulic pressure is applied to the cylinder portion $16b$ of the caliper member 16, the piston 20 presses the inner brake pad 11 toward the inner side surface of the disc rotor 10 and the reaction portion $16a$ pressing the outer brake pad 12 toward to an outer side surface of the disc rotor 10. A cylinder portion $16b$ receives a piston 20 which presses the inner brake pad 11 toward an inner side surface of the disc rotor 10 and a bridge portion $16c$ connects the reaction portion $16a$ and the cylinder portion $16b$. Further, the caliper member 16 is provided with a pair of arm portions $16d$, $16e$ and is slidably supported on a pair of pins 18, 19 which are fixed to the mounting member 13 in an axial direction at the arm portions $16d$, $16e$. The sliding portions between each arm portion $16d$, $16e$ and each pin 18, 19 is sealed in a liquid tight manner and is protected from muddy water and so on by pin boots 21, 22, respectively, and the sliding portion between a cylinder hole of the cylinder portion $16b$ and the piston 20 is sealed by a seal ring 23 and is protected from muddy water and so on by a boot 24.

According to this embodiment, when the hydraulic pressure is applied to the cylinder portion $16b$ of the caliper member 16, the piston 20 presses the inner brake pad 11 toward the inner side surface of the disc rotor 10 and the reaction portion $16a$ presses the outer brake pad 12 toward the outer side surface of the disc rotor 10 by a reaction force of the hydraulic pressure pressing the inner brake pad 11 through the piston 20. Both brake pads 11, 12 are frictional engaged with the disc rotor 10, and the friction force F directed in the tangent direction of the rotational direction of the disc rotor 10 is transmitted to the press center, i.e., substantially the center portion of the each brake pad 11, 12, from the disc rotor 10. The friction force F transmitted to the inner brake pad 11 is directly resisted at the arm portion 13a of the mounting member 13, and the friction force F transmitted to the outer brake pad 12 is transmitted from the reaction portion 16a of the caliper member 16 to the pins 18, 19 through the bridge portion 16c, the cylinder portion 16b and a pair of arm portions 16d, 16e and is resisted at the arm portion 13a of the mounting member 13.

When the friction force F is transmitted to the inner surface 11, as shown by FIG. 6, the friction force F is resisted at the V-shaped torque resisting surface 13a5 which the end surface 11a3 of the backing plate 11a of the inner brake pad 11 of the leading side, i.e., the exit side in the rotational direction of the disc rotor 10 engages. Then, since the torque resisting surface 13a5 is formed at the rotational center side of the disc rotor 10 (the torque resisting surface 13a5 is offset to the rotational center side of the disc rotor 10 with respect to substantially the center portion of the inner brake pad 11) a rotational moment, in which the torque resisting surface 13a5 serves as a supporting point, is transmitted to the inner brake pad 11 by the friction force F. The ear portion 11a2 of the backing plate 11a of the inner brake pad 11 of the trailing side, i.e., the entry side in the rotational direction of the disc rotor 10 is engaged with an upper wall surface of the groove portion 13a4 by a force P due to the rotational moment and the rotational moment is resisted at the upper wall surface of the groove portion 13a4.

Under the above conditions, the inner brake pad 11 is pressed to the torque resisting surface 13a5 of the arm portion 13a of the mounting member 13 at the end surface 11a3 of the backing plate 11a of the inner brake pad 11 of the leading side, i.e., the exit side in the rotational direction of the disc rotor 10 by the friction force F resisted from the disc rotor 10 and is pressed to the upper wall surface of the groove portion 13a4 of the mounting member 13 at the ear portion 11a2 of the backing plate 11a of the inner brake pad 11 of the trailing side, i.e., the entry side in the rotational direction of the disc rotor 10 by the rotational moment generated by the friction force F. Thereby, the inner brake pad 11 is held in a stable condition in the direction of its diameter and the rotational direction of the disc rotor 10, and the inner brake pad 11 is prevented from movement.

Accordingly, the following formula (1) is obtained by balancing of the moment.

$$F \cdot l = P \cdot L, \quad P = F \cdot l/L \quad (1)$$

Also, under the above condition, a force Fl which moves the inner brake pad 11 upwardly on the torque resisting surface 13a5 by the friction force F in FIG. 6 (a force Fl which moves the inner brake pad 11 toward the outer circumference of the disc rotor 10 on the torque resisting surface 13a5 by the friction force F) is obtained as shown by the following formula (2), and a force Pl which the inner brake pad 11 moves downwardly on the torque resisting surface 13a5 by a reaction force of the operational force P due to the rotational moment in FIG. 6 (a force Pl which moves the inner brake pad 11 toward the rotational center of the disc rotor 10 on the torque resisting surface 13a5 by a reaction force of the operational force P due to the rotational moment) is obtained as shown in the formula (3).

$$Fl = F \cdot \sin\Theta - \mu \cdot F \cdot \cos\Theta = F \cdot (\sin\Theta - \mu \cdot \cos\Theta) \quad (2)$$

$$\begin{aligned} Pl &= P \cdot \cos\Theta - \mu \cdot P \cdot \sin\Theta \\ &= F \cdot l/L \cdot \cos\Theta - \mu \cdot F \cdot l/L \cdot \sin\Theta \\ &= F \cdot l/L \cdot (\cos\Theta - \mu \cdot \sin\Theta) \end{aligned} \quad (3)$$

where $\mu$ is the friction coefficient of the torque resisting surface.

Accordingly, in case the inner brake pad 11 moves downwardly in FIG. 6 (i.e., that the inner brake pad 11 moves toward the rotational center of the disc rotor 10), the relationship between the force Fl and the force Pl must satisfy the relationship $Fl \geq Pl$. And then, an angle of inclination $\Theta$ of the torque resisting surface 13a5 (13a6) which satisfies this conditions is obtained by the following formula (4).

$$\begin{aligned} Fl = F \cdot (\sin\Theta - \mu \cdot \cos\Theta) &\geq F \cdot l/L \cdot (\cos\Theta - \mu \cdot \sin\Theta) \\ L \cdot (\sin\Theta - \mu \cdot \cos\Theta) &\geq l \cdot (\cos\Theta - \mu \cdot \sin\Theta) \\ L \cdot (\tan\Theta - \mu) &\geq l \cdot (1 - \mu \cdot \tan\Theta) \\ \tan\Theta &\geq (l + \mu \cdot L)/(L + \mu \cdot l) \end{aligned} \quad (4)$$

As mentioned above, even though the friction force F transmitted to the inner brake pad 11 (the position of the press center) changes in the diameter direction and the rotational direction of the disc rotor 10 by means of the concavity-convexity of the frictional surface of the inner brake pad 11, movement of the disc rotor 10, a bending of the caliper member 16 (the bridge portion 16c of the caliper member 16 bends so as to separate the reaction portion 16a from the cylinder portion 16b) and the inclination of the caliper member 16 in the disc brake operation or the dimensions of the friction force F changes in the disc brake operation, the movement of the inner brake pad 11 under the operating condition of the disc brake assembly is prevented by means of the predetermined angle of inclination $\Theta$ of the torque resisting surface 13a5 (13a6) so as to satisfy the formula (4).

In this embodiment, since the outer brake pad 12 is received into the holes 16a1, 16a2 formed in the reaction portion 16a of the caliper member 16, at a pair of engaging projections 12a1, 12a2 formed in the backing surface of the backing plate 12a, the outer brake pad 12 is not moved by the friction force F which is transmitted to the outer brake pad 12.

Figure 7:
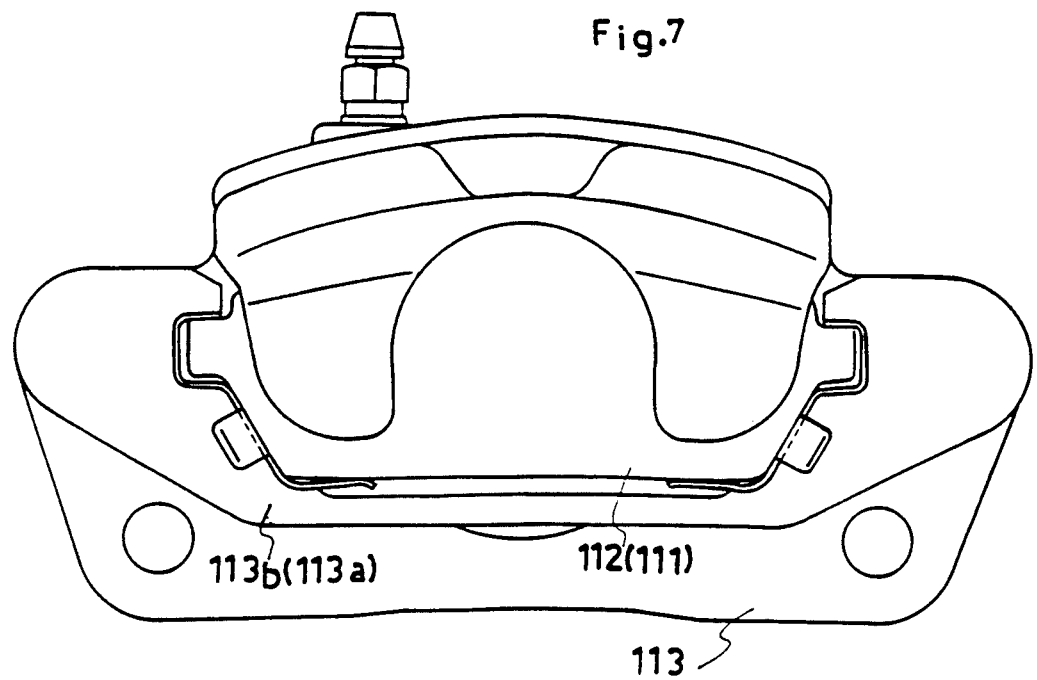
FIG. 7 is an elevation view of an illustration of a variation of disc brake assembly in accordance with the present invention.
Figure 8:
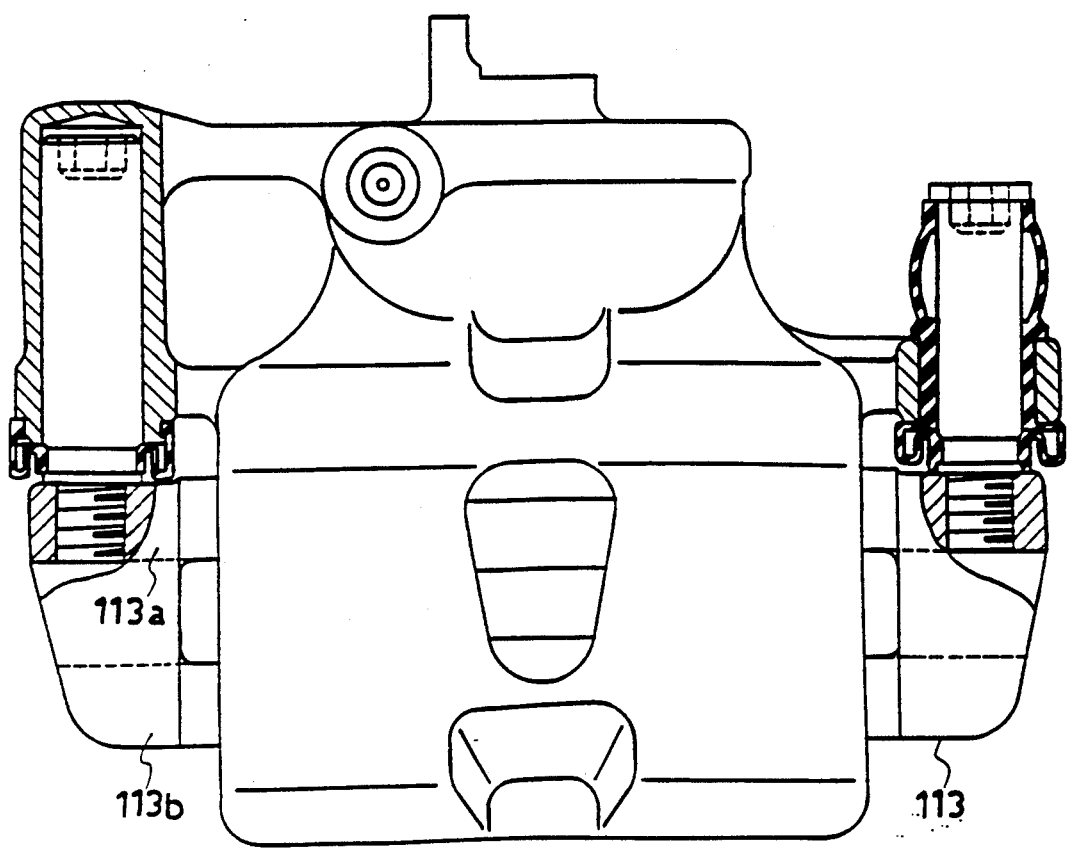
FIG. 8 is a partly sectional plan view of a disc brake assembly shown in FIG. 7.
Figure 9:
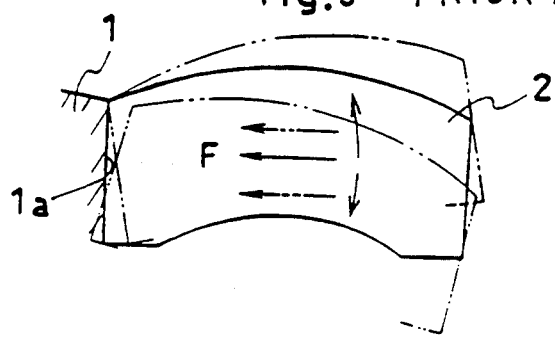
FIG. 9 is a diagram of the movement of the brake pad of the prior art.

In the above embodiment, the invention is directed to a disc brake assembly of a type in which the friction force F transmitted to the outer brake pad 12 is transferred from the backing plate 12a to the reaction portion 16a. However, the invention is also directed to a disc brake assembly of the type in which an inner brake pad 111 is installed to an arm portion 113a of a mounting member 113 and which an outer brake pad 112 is installed to an arm portion 113b of the mounting member 113, and in which a friction force transmitted to the inner brake pad 111 is directly transferred to and resisted by the arm portion 113a and in which a friction force transmitted to the outer brake pad 112 is directly transferred to an resisted by the arm portion 113b as shown by FIG. 7 and FIG. 8.

As mentioned above, according to the present invention, the brake pad is pressed to the V-shaped torque resisting surface of the arm portion of the mounting member at the end surface of the backing plate of the brake pad of the leading side, i.e., the exit side in the rotational direction of the disc rotor by the friction force which is resisted by the disc rotor and is pressed to the upper wall surface of the groove portion of the mounting member which receives the ear portion at the ear portion of the backing plate of the inner brake pad of the trailing side, i.e., the entry side in the rotational direction of the disc rotor by the rotational moment generated by the friction force under the operating condition of the disc brake assembly. Since the brake pad is held in a stable condition in the diameter direction and the rotational direction of the disc rotor and is prevented from movement, it is able to fundamentally prevent the generation of the uncomfortable squeak noise of the disc brake assembly caused to the movement of the brake pad. Further, according to the present invention, since the above effect is obtained by the partial changes of the backing plate of the brake pad and the arm portion of the mounting member, the prevention of the squeak issue is realized in a simple manner having low manufacturing cost.

Further, since the brake pad is able to disperse and transmit the friction force resisted from the disc rotor to the torque resisting surface of the arm portion of the mounting member of the leading side, i.e., the exit side in the rotational direction of the disc rotor and the groove portion of the arm portion of the mounting member of the trailing side, i.e., the entry side in the rotational direction of the disc rotor, the thickness of the backing plate can be decreased as can the width of the torque resisting surface which resists the backing plate. Thereby, the disc brake assembly is able to be made smaller and to decrease weight of the disc brake assembly. Further, as the arrangement is able to prevent the partial deformation of the arm portion of the mounting member, it is able to prevent abnormal wear of the brake pad and slide inferiority of the brake pad which is generated following the above partial deformation.

Further, since the friction force transmitted to the brake pad is resisted by the portion near the inner circumference portion of the mounting member which is fixed to a part of the vehicle body at the inner circumference portion, the moment transmitted to the torque resisting surface of the mounting member is small and it is easy to ensure the rigidity of the mounting member.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A disc brake assembly comprising:
a disc rotor connected with a wheel of a vehicle so as to be rotatable therewith;
a mounting member fixed to a stationary member of a vehicle and having an arm portion in which a pair of grooves extend in an axial direction of said disc rotor;
a brake pad positioned on at least one side of said disc rotor and having a backing plate associated therewith, said backing plate being provided with a pair of ear portions which project outwardly of a center portion of both ends of said backing plate in a rotational direction of said disc rotor, said ear portions being received in said pair of grooves formed in said arm portion of said mounting member and slidably supported on said arm portion of said mounting member in an axial direction of said disc rotor;
said backing plate having wedge-shaped end surfaces extending in the diameter direction of said disc rotor, each of said wedge-shaped end surfaces being positioned adjacent one of the ear portions and on the side of the respective ear portion disposed toward the rotational center of the disc rotor and
said mounting member having torque resisting surfaces opposed to the wedge-shaped end surfaces on said backing plate, said torque resisting surfaces being separate from and displaced from each ear portion of said backing plate and being separate from and displaced from said grooves formed in said arm portion of said mounting member, said torque resisting surfaces being formed in a shape corresponding to the end surfaces of said backing plate, said torque resisting surfaces being offset from a press center of said brake pad and said wedge-shaped end surfaces on the backing plate cooperating with the torque resisting surfaces on the mounting member so that during operation of the disc brake assembly, the wedge-shaped end surfaces on the backing plate engage and transmit torque to the torque resisting surfaces on the mounting member.

2. The disc brake assembly according to claim 1, wherein each of said wedge-shaped end surfaces on the backing plate is directly connected to the respective adjacent ear portion.

3. A disc brake assembly comprising:
a disc rotor connected with a wheel of a vehicle so as to be rotatable therewith;
a mounting member fixed to a stationary member of a vehicle and having at least one arm portion in which a pair of groove portions extend in an axial direction of said disc rotor;
a pair of brake pads disposed so that one brake pad is positioned on each side of said disc rotor, at least one of said brake pads being provided with a backing plate, said backing plate having a pair of ear portions which project outwardly at a center portion of both ends of said backing plate in a rotational direction of said disc rotor and which are received in said pair of groove portions formed in said arm portion of said mounting member and slidably supported on said arm portion of said mounting member in an axial direction of said disc rotor;
guide means positioned in said axial direction of said disc rotor;
a caliper member slidably supported on said guide means to be movable in an axial direction, said caliper member straddling a portion of said disc rotor and having a fluid actuator provided with a piston on one side thereof to press one of said brake pads against one face of said disc rotor and a reaction portion on an opposite side thereof to press the other said brake pad against an opposite face of said disc rotor;

said one brake pad being provided with said backing plate and said backing plate having end surfaces that are formed in a wedge-shape in the diameter direction of said disc rotor, each of said wedge-shaped end surfaces being positioned adjacent one of said ear portions and on the side of the respective ear portion disposed towards the rotational center of the disc rotor; and said mounting member having torque resisting surfaces opposed to the wedge-shaped end surfaces on the backing plate, said torque resisting surfaces being separate from and displaced from each ear portion of said backing plate and being separate from and displaced from said groove portions formed in said arm portion of said mounting member, said torque resisting surfaces being formed in a V-shape corresponding to the end surfaces of the backing plate, said torque resisting surfaces being offset from a press center of said one brake pad and said wedge-shaped end surfaces on the backing plate cooperating with the torque resisting surfaces on the mounting member so that during operation of the disc brake assembly, the wedge-shaped end surfaces on the backing plate engage and transmit torque to the torque resisting surfaces on the mounting member.

4. A disc brake assembly as recited in claim 3, including a spring connected to said arm portion of said mounting member and urging said brake pads so that said ear portions contact an upper wall surface of said groove portions of said mounting member.

5. A disc brake assembly as recited in claim 4, said spring including a spring positioned along each groove portion.

6. A disc brake assembly as recited in claim 3, said reaction portion of said caliper member being provided with a pair of holes and the other one of said brake pads being provided with a pair of engaging projecting portions received in said holes of said reaction portion.

7. A disc brake assembly as recited in claim 6, wherein said other one of said brake pads is provided with a supporting projection portion, and said disc brake assembly further comprises a spring positioned between said supporting projection portion of said other brake pad and said reaction portion for urging said other brake pad toward the rotational center of said disc rotor and in a direction which separates the other brake pad from said disc rotor.

8. A disc brake assembly as recited in claim 3, wherein said mounting member is provided with a second arm portion, said second arm portion having a pair of grooves extending in the axial direction of said disc rotor, the other one of said brake pads being provided with a second backing plate having a pair of ear portions which project outwardly at a center portion and opposite ends of the second backing plate in the rotational direction of said disc rotor, said ear portions on said second backing plate being received in said groove portions in the second arm portion and being slidably supported on said second arm portion of said mounting member in the axial direction of said disc rotor, the second backing plate having end surfaces formed in a wedge-shape in the diameter direction of said disc rotor, each of said end surfaces on said second backing plate being positioned adjacent one of said ear portions on said second backing plate and on the side of the respective ear portion disposed towards the rotational center of the disc rotor, said mounting member being provided with torque resisting surfaces opposed to the wedge-shaped end surfaces on the second backing plate and formed in a V-shape corresponding to the end surfaces of the second backing plate.

9. A disc brake assembly as recited in claim 8, said torque resisting surfaces being offset from press centers of said each brake pad.

10. The disc brake assembly according to claim 3, wherein each of said wedge-shaped end surfaces on the backing plate is directly connected to the respective adjacent ear portion.

* * * * *